May 13, 1958
C. O. M. MASON
2,834,407
BURNER FOR BAKERY OVENS
Filed Jan. 31, 1956
2 Sheets-Sheet 2
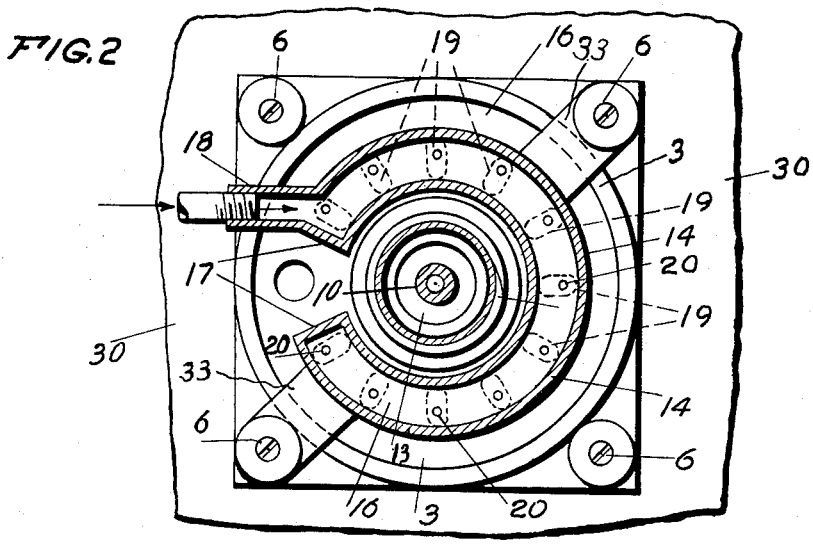
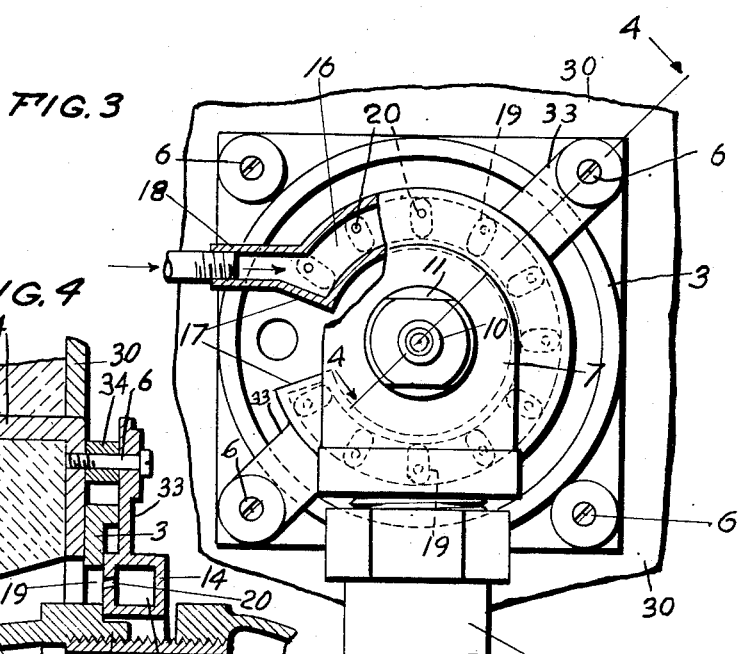
INVENTOR
CHARLES O. M. MASON
BY Louis C. Smith
ATTORNEY

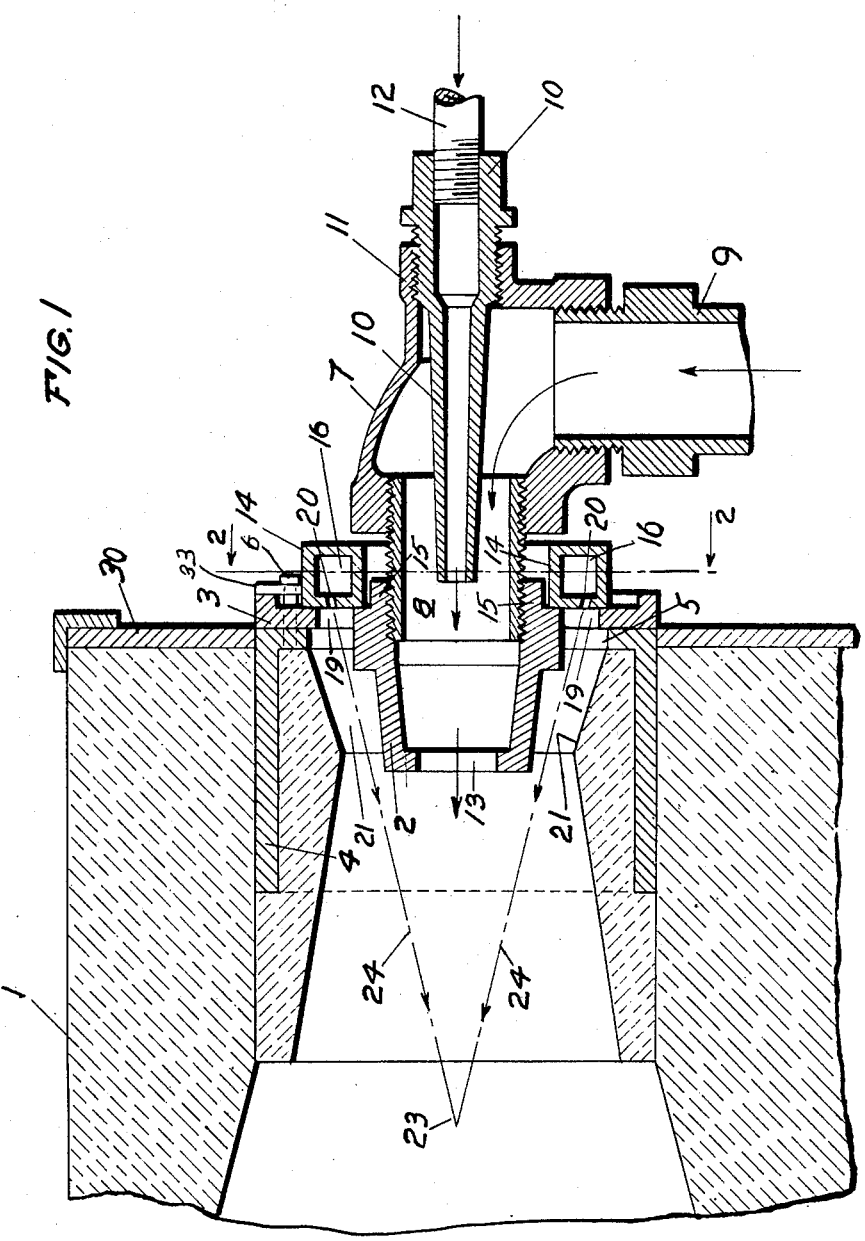

United States Patent Office 2,834,407
Patented May 13, 1958

2,834,407

BURNER FOR BAKERY OVENS

Charles O. M. Mason, East Weymouth, Mass., assignor, by mesne assignments, to Quincy Syrian Baking Co., Inc., Quincy, Mass., a corporation of Massachusetts Application January 31, 1956, Serial No. 562,494

1 Claim. (Cl. 158—109)

This invention relates to a burner designed for use in a bakery. In baking some kinds of bread such as that commonly known as Syrian bread it is necessary to use a relatively high temperature in the baking oven, that is, a temperature on the order of 800° F., and it is an object of the present invention to provide a novel burner by which this relatively high temperature can be produced without danger of blow-backs, and which will insure that the air and gaseous fuel are completely and evenly mixed at the point of combustion.

In order to give an understanding of the invention, I have illustrated in the drawings a selected embodiment thereof which will now be described, after which the novel features will be pointed out in the appended claim.

In the drawings:

Fig. 1 is a sectional view showing a portion of the wall of a baking oven having my improved burner installed therein.

Fig. 2 is a section on the line 2—2, Fig. 1.

Fig. 3 is a side view of the burner with a part broken out.

Fig. 4 is a section on the line 4—4, Fig. 3.

In the drawings 1 indicates a portion of the wall of a baking oven which has an opening in which my improved burner is installed. The burner comprises a burner element 2 having a generally tubular shape provided near its rear end with an outwardly extending flange 3 which overlies the outer face of the baking oven and by which the burner element is secured to a support member 4 that is mounted in the brick work of the oven wall 1. This support member has an opening 5 in its outer end through which the burner element 2 extends and the flange 3 of the burner element is attached to the support member 4 by means of bolts or screws 6.

The burner element is tubular in form and has a smaller diameter than that of the opening in the wall of the oven in which it is installed, thereby providing an annular space 21 between the burner and the wall of the opening. The outer portion of said opening in which the burner is located has a progressively decreasing diameter from its outer end and the burner has a tapered inner end portion so that said annular space 21 converges from its outer end toward the tip of the burner. The flange 3 of the burner spans the outer end of the annular space 21 and has openings 19 therethrough which communicate with said space. The gaseous fuel is delivered to the burner element through a T-coupling member 7 which is connected to the burner element by means of a screw-threaded nipple or sleeve 8 and which has a gas supply pipe 9 leading thereinto.

10 is a primary air injection tube which is mounted in the end portion 11 of the T-coupling 7 and which is located axially of the burner member 2 and extends from the nipple 8 into said element 2 as shown. This air injection tube 10 is screw threaded into the end portion 11 of the T-coupling and has an air delivery pipe 12 secured thereto. Said air injection tube is preferably tapered as shown with the smaller end extending into the burner element 2 and its purpose is to supply air to the current of gas which is delivered to the burner tube, the gas and air mixture passing through the discharge opening 13 of the burner element into the combination chamber.

The burner herein shown also includes a means for delivering secondary air into the combustion chamber in advance of the burner element 2.

For this purpose I have provided a secondary air injection ring 14 which is located outside of the flange 3 of the burner element and which encircles the rear end portion 15 thereof. This air injection ring 14 is an open ring and is provided with an interior air chamber 16 which extends throughout the circumferential dimension of said ring and is closed at its ends as indicated at 17. Said ring 16 is formed with an inlet nipple 18 through which secondary air is delivered into the air chamber 16.

As stated above, the flange 3 of the burner element 2 is provided with a plurality of openings 19 which surround the tubular portion of the burner element and have communication with the annular air space 21. The inner wall of the said injection ring contacts with the outer face of the flange 3 and covers the openings 19 therein. Said inner wall is provided with a plurality of jet apertures 20, one for each opening 19, each jet aperture being situated approximately centrally of the corresponding opening 19. The openings 19 in the flange 3 of the burner element register with this space 21 and the jet openings 20 in the air injection ring 14 are slightly inclined so that the jets of air which issue therefrom are directed through the annular space 21 toward a point 23 located in the axial line of the burner and in advance thereof as shown by the dotted lines 24.

These jets of secondary air commingle with the air gas mixture which is delivered through the discharge opening 13 of the burner element and are instrumental in producing complete combustion of the air gas mixture and also in producing a flame of the relatively high temperature required for baking the so-called Syrian bread.

The injection ring 14 may be mounted on the supporting member 4 in any suitable way. As shown in Figs. 2 and 3 said ring has two outwardly extending arms 33 which are of a length so that one of the screws 6 may pass therethrough, as shown best in Fig. 4, and by this means the ring 14 is properly secured to the supporting member 4 by the means for securing the flange 3 thereto.

In Fig. 4 a collar 34 is shown between the arm 33 and the supporting member 4 so as to prevent undue strain being applied to the portion of the arm 33 which projects beyond the flange 3 of the burner element.

I claim:

A burner for a baking oven which has a combustion chamber and a burner-receiving opening in one wall thereof that communicates with the combustion chamber, said burner having a tubular burner element provided at its rear portion with a laterally extending flange, adapted to overlie and be bolted to the outside of the wall of the baking oven and to support said burner element with the major portion thereof within said burner-receiving opening, said burner element having a diameter sufficiently smaller than that of the burner-receiving opening to provide an annular space of substantial width between said burner element and the wall of said burner-receiving opening, which annular space is adapted to be covered by said flange, said flange having openings therein adapted to communicate with said annular space, means to deliver gaseous fuel to the burner element, means to deliver a stream of primary air to the burner element axially thereof, an air induction ring separate from the burner element and encircling the rear end thereof, said ring having an interior chamber, a supporting arm rigid with said ring and extending outwardly therefrom in a radial direction, said arm overlapping said flange and adapted to be secured thereto by the means for bolting the flange to the wall of the baking oven, said arm being operative to hold the inner face of the ring against the outer face of the flange, said inner face of the ring having jet openings therethrough which communicate with said chamber and register with the openings in said flange, said jet openings being directed toward a point in front of the burner element, and means to deliver secondary air to the chamber of the air induction ring whereby jets of secondary air are delivered through said jet openings.

References Cited in the file of this patent

UNITED STATES PATENTS

| | | |
|---|---|---|
| 1,022,861 | McCoy | Apr. 9, 1912 |
| 1,411,470 | Bergman | Apr. 4, 1922 |
| 1,802,137 | Creamer | Apr. 21, 1931 |
| 2,046,371 | Dreffein | July 7, 1936 |
| 2,060,993 | Keith | Nov. 17, 1936 |
| 2,126,417 | Sharp | Aug. 9, 1938 |
| 2,458,543 | Urquhart | Jan. 11, 1949 |
| 2,637,283 | Klein | May 5, 1953 |

FOREIGN PATENTS

| | | |
|---|---|---|
| 334,187 | Germany | Mar. 9, 1921 |
| 316,667 | Great Britain | May 22, 1930 |